(12) United States Patent
Millsaps, II

(10) Patent No.: US 9,580,874 B2
(45) Date of Patent: Feb. 28, 2017

(54) PORTABLE MATERIAL DELIVERY APPARATUS

(71) Applicant: James William Millsaps, II, Friendsville, TN (US)

(72) Inventor: James William Millsaps, II, Friendsville, TN (US)

( * ) Notice: Subject to any disclaimer, the term of this patent is extended or adjusted under 35 U.S.C. 154(b) by 0 days.

(21) Appl. No.: 14/934,229

(22) Filed: Nov. 6, 2015

(65) Prior Publication Data

US 2016/0129823 A1    May 12, 2016

Related U.S. Application Data

(60) Provisional application No. 62/076,105, filed on Nov. 6, 2014.

(51) Int. Cl.
| | |
|---|---|
| *B60P 1/36* | (2006.01) |
| *E01C 19/15* | (2006.01) |
| *B65G 37/00* | (2006.01) |
| *B65G 15/16* | (2006.01) |
| *B65G 41/00* | (2006.01) |

(52) U.S. Cl.
CPC ............... *E01C 19/15* (2013.01); *B60P 1/36* (2013.01); *B65G 15/16* (2013.01); *B65G 37/00* (2013.01); *B65G 41/002* (2013.01); *B65G 2201/04* (2013.01); *B65G 2812/015* (2013.01)

(58) Field of Classification Search
CPC .... B60P 1/36; B60P 1/16; B60P 1/283; B60P 1/34; B60P 1/56; A01D 90/08; A01D 90/10; A01D 41/1217; B65F 3/205; B65G 37/00; B65G 2812/015; B65G 41/002; B65G 15/16; B65G 2201/04; B65G 23/14; B65G 21/00; B65G 15/42; B65G 2201/045; E01C 19/15; E01C 19/2005; E01C 19/202; E01C 2019/2095; E01C 23/04; E01C 19/16; E01C 23/098; E02D 31/02; E04B 1/644
USPC ................. 414/501, 502, 503, 505, 508; 406/122–144, 151–153
See application file for complete search history.

(56) References Cited

U.S. PATENT DOCUMENTS

| | | | | |
|---|---|---|---|---|
| 1,562,929 | A * | 11/1925 | Trovaton | A01D 33/00 177/98 |
| 3,693,840 | A * | 9/1972 | Starr | A21C 9/04 406/129 |

(Continued)

*Primary Examiner* — Andrew J Triggs
(74) *Attorney, Agent, or Firm* — Luedeka Neely Group, P.C.

(57) ABSTRACT

A portable material delivery apparatus for transporting and depositing a flowable material at a deposit site, including a vehicle and a hopper mounted on the vehicle for holding the material and having a lower opening for releasing the material. First and second circulating conveyors move the material released from the hopper to the deposit site. The first conveyor is fixed beneath the hopper. The second conveyor is vertically tiltable and laterally rotatable relative to the first conveyor. The apparatus includes a control station with an operator platform and controls for controlling the conveyors. The control station is mounted to and is movable with the second conveyor as it tilts and rotates. The control station is positioned such that a single operator standing on the operator platform can operate the controls while directly observing the material moving on the second conveyor and being ejected toward the deposit site.

18 Claims, 7 Drawing Sheets

(56) References Cited

U.S. PATENT DOCUMENTS

| | | | | |
|---|---|---|---|---|
| 4,169,536 A * | 10/1979 | Seem | B60P 1/36 198/316.1 |
| 4,311,408 A * | 1/1982 | Wren | E01C 19/15 298/24 |
| 5,234,094 A * | 8/1993 | Weyermann | B65G 65/28 198/303 |
| 5,634,545 A * | 6/1997 | Plumley | B65G 37/00 198/303 |
| 5,685,687 A * | 11/1997 | Frye | B60P 1/36 198/809 |
| 6,146,080 A * | 11/2000 | Sinke | B60P 1/36 414/519 |
| 6,321,758 B1 * | 11/2001 | Sturgill | A24B 1/08 131/110 |
| 7,278,804 B2 * | 10/2007 | Deal | E21B 21/062 175/206 |
| 7,540,398 B2 * | 6/2009 | Medemblik | B60P 1/36 105/282.3 |
| 7,988,403 B2 * | 8/2011 | Ricketts | A01D 90/105 414/505 |
| 8,317,116 B2 * | 11/2012 | Dirk | B03B 9/02 241/101.5 |
| 8,789,784 B2 * | 7/2014 | Ange, III | B02C 21/026 241/101.74 |
| 9,016,799 B2 * | 4/2015 | Bjornson | B03B 9/02 299/18 |
| 9,346,473 B1 * | 5/2016 | Herzog | B61D 7/02 |
| 2006/0239806 A1 * | 10/2006 | Yelton | B60P 1/42 414/502 |
| 2009/0274516 A1 * | 11/2009 | Colkitt | E01C 23/04 404/75 |
| 2010/0070144 A1 * | 3/2010 | Burke | A01D 41/1217 701/50 |
| 2014/0227069 A1 * | 8/2014 | Hilvers | B60P 1/36 414/332 |
| 2015/0237803 A1 * | 8/2015 | Hilvers | B60P 1/36 414/332 |
| 2016/0129823 A1 * | 5/2016 | Millsaps, II | B60P 1/60 414/505 |

* cited by examiner

PORTABLE MATERIAL DELIVERY APPARATUS

CROSS-REFERENCE TO RELATED APPLICATIONS

This application claims the benefit of U.S. Provisional Application No. 62/076,105, filed Nov. 6, 2014 and entitled Blast Hole Stemming Machine, the disclosure of which is incorporated by reference herein in its entirety.

FIELD OF THE INVENTION

This invention relates to the field of material transport and delivery. More particularly, this invention relates to an apparatus to facilitate transport and precise delivery of a flowable material to a deposit site, particularly those deposit sites having restricted conditions.

BACKGROUND AND SUMMARY

Explosive blasting in construction and mining operations requires drilling a large number of blast holes into the ground, typically in a grid pattern across the entire blast site, placing explosive charges into the holes and then detonating the charges. The explosion fragments solid rock by sending shock waves through the ground, which makes the process of removing the rock significantly easier.

Before the explosives are detonated, the blast holes are covered with non-volatile matter, such as crushed gravel and water, in a process commonly referred to as stemming. Each of the blast holes is stemmed to prevent high velocity explosive blast gases from escaping through the top of the blast holes. Minimizing or preventing the escape of the blast gases is important for at least two reasons. First, creating the shock wave that fragments rock requires a buildup of pressurized gas. If the blast gases were permitted to escape out of the blast hole, the effectiveness of the blast would be greatly diminished. Second, stemming the blast holes makes the detonation much safer by minimizing the amount of material that is projected from the blast hole.

Often times the stemming process is carried out using front end loaders, track hoes, skid loaders, etc. Other times, due to the blast site conditions, hand carrying buckets of stemming material to each blast hole and pouring the material into the hole is required. An advantage of this method is that the worker can inspect the material as it fills the hole. This is important because material that is too large or foreign materials may cause the blast to become less effective or even dangerous. Given the large number of blast holes that are present at each blast site, the stemming process has historically been very labor intensive and time consuming.

Another method for stemming holes has been to fill a large dump truck. This process involves, for example, filling the truck with stemming material using a front loader, driving the truck to the blast site, pouring the stemming material into a blast hole using a conveyor system mounted to the truck, and then driving to the next blast hole and repeating the filling process. However, using this method does not provide an opportunity for the truck operator to inspect the stemming material as it fills the hole. Also, due to their large size, these types of large trucks are not well suited for sites have restricted or limited space.

Accordingly, there is a need for an apparatus that enables stemming material to be quickly and conveniently poured into a blasting hole in locations having restricted or limited space and that allows a worker to directly inspect the material as it is poured.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The present disclosure provides embodiments of an agile material transport and delivery apparatus that is optionally self-loading and self-unloading and that provides a floating user platform that enables the user to visually inspect the material prior to being deposited and as it is deposited at a deposit site. These features make this apparatus well suited as a stemming machine used in the transport and delivery of flowable stemming material, such as a crushed rock and water slurry, to blasting holes. These features also make this apparatus well suited for other applications as well. For example, the apparatus may be used in the landscaping industry for the transport and delivery of gravel, peat moss, mulch, fertilizer and the like, including in residential locations having restricted or limited space. In the description that follows, the apparatus is described as a stemming machine in order to simplify the description but should not be understood to limit the scope of the invention. The term "flowable material" refers to materials that may be carried and deposited by the material transport and delivery apparatus disclosed herein, including gravel, sand, rock, dirt, mulch, fertilizer, and the like.

Figure 1:
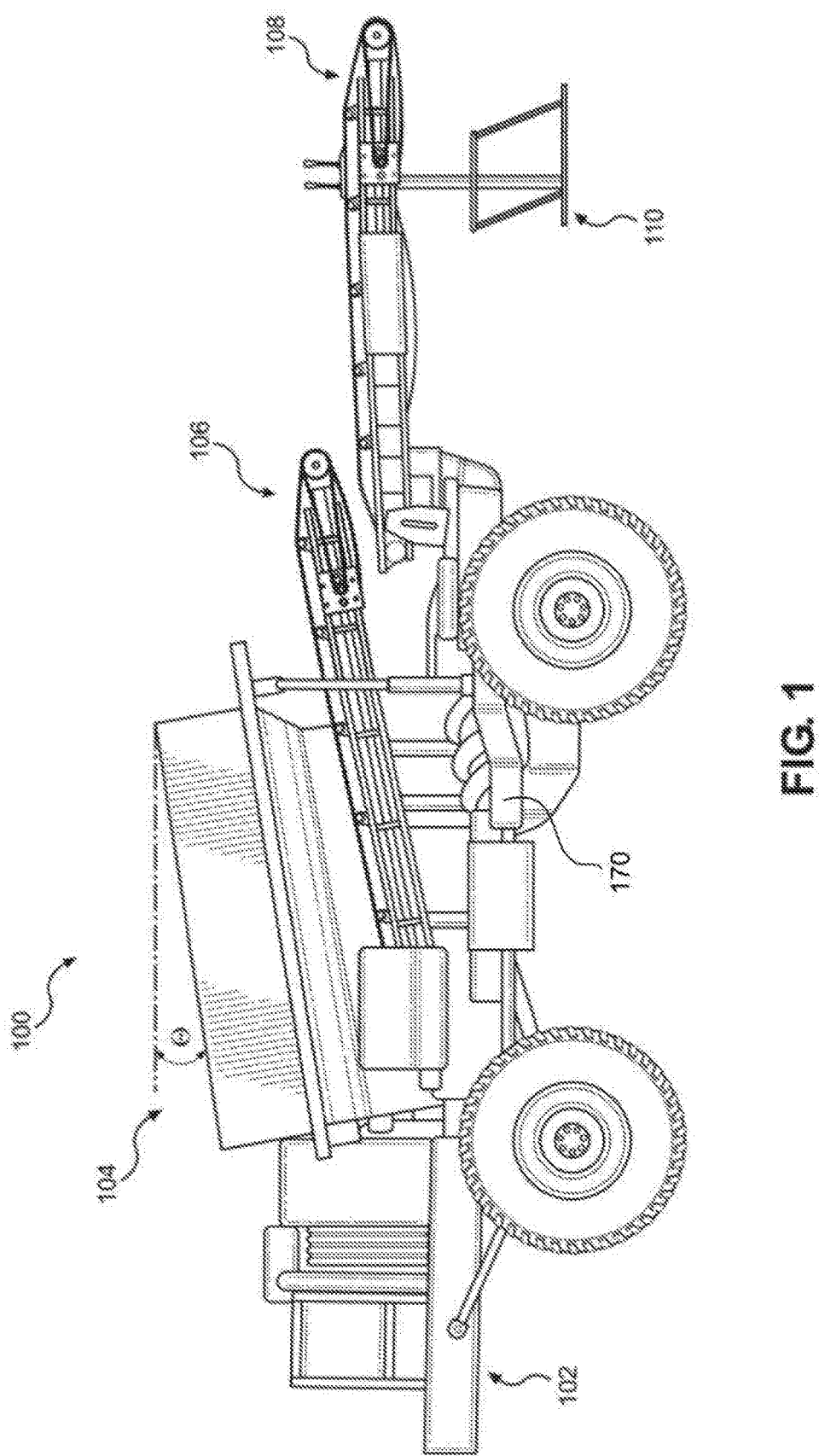
FIG. 1 is a side elevation view of a portable material delivery apparatus according to an embodiment of the present invention.
Figure 2:
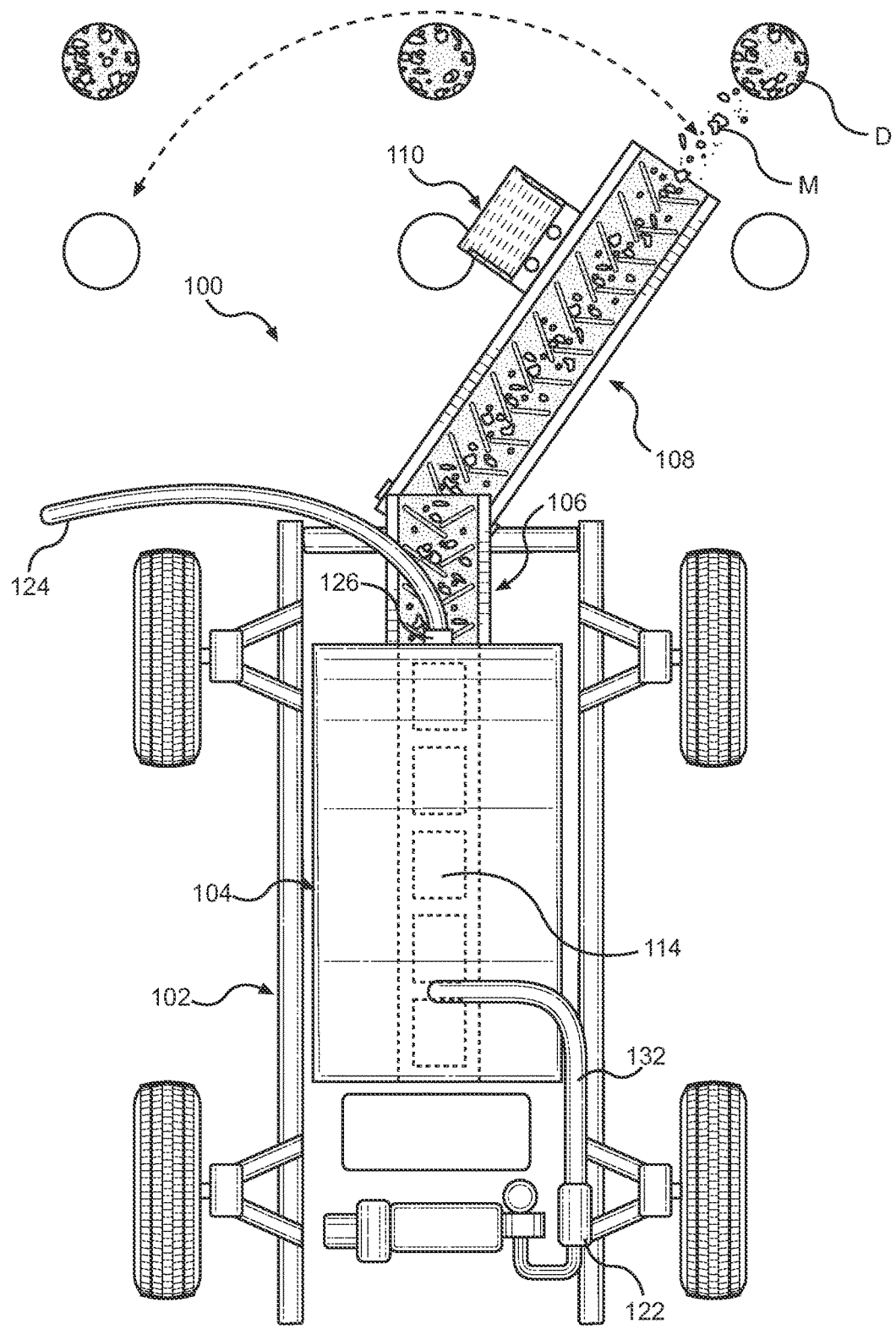
FIG. 2 is a plan view of a portable material delivery apparatus according to an embodiment of the present invention, including a main conveyor rotating laterally from left to right relative to a feed conveyor.
Figure 3:
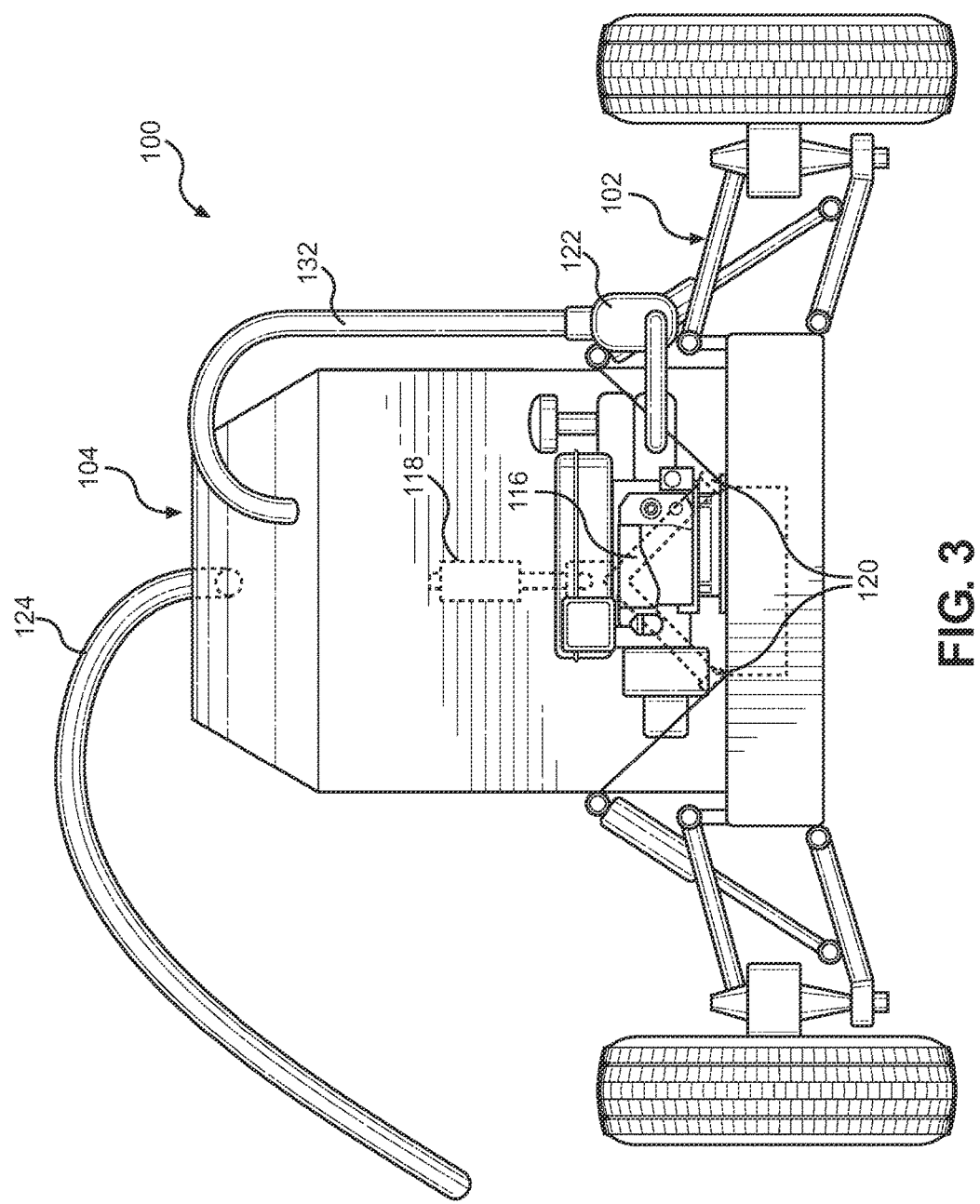
FIG. 3 is a rear elevation view of a hopper and vehicle for a material delivery apparatus according to an embodiment of the present invention.

Referring now to the drawings in which like reference characters designate like or corresponding characters throughout the several views, there is shown in FIGS. 1-3 a portable material delivery apparatus 100 for transporting and selectively depositing a flowable material M at a deposit site D according to an embodiment of the present invention. The apparatus 100 generally includes a vehicle 102, a hopper 104 mounted on the vehicle, first and second circulating conveyor belts 106, 108 mounted directly onto the vehicle, and a control station 110 mounted to the second conveyor belt. In this particular embodiment, the vehicle 102 is driven by a gas-powered engine and the conveyors are driven by hydraulics.

The vehicle 102 preferably includes a small chassis 170, about the size of a pickup truck, which makes the apparatus highly agile when compared to other stemming machines which are typically mounted onto large dump trucks. This enables the apparatus 100 to be maneuvered more easily and to travel into places that larger vehicles would not be able to travel.

Figure 4:
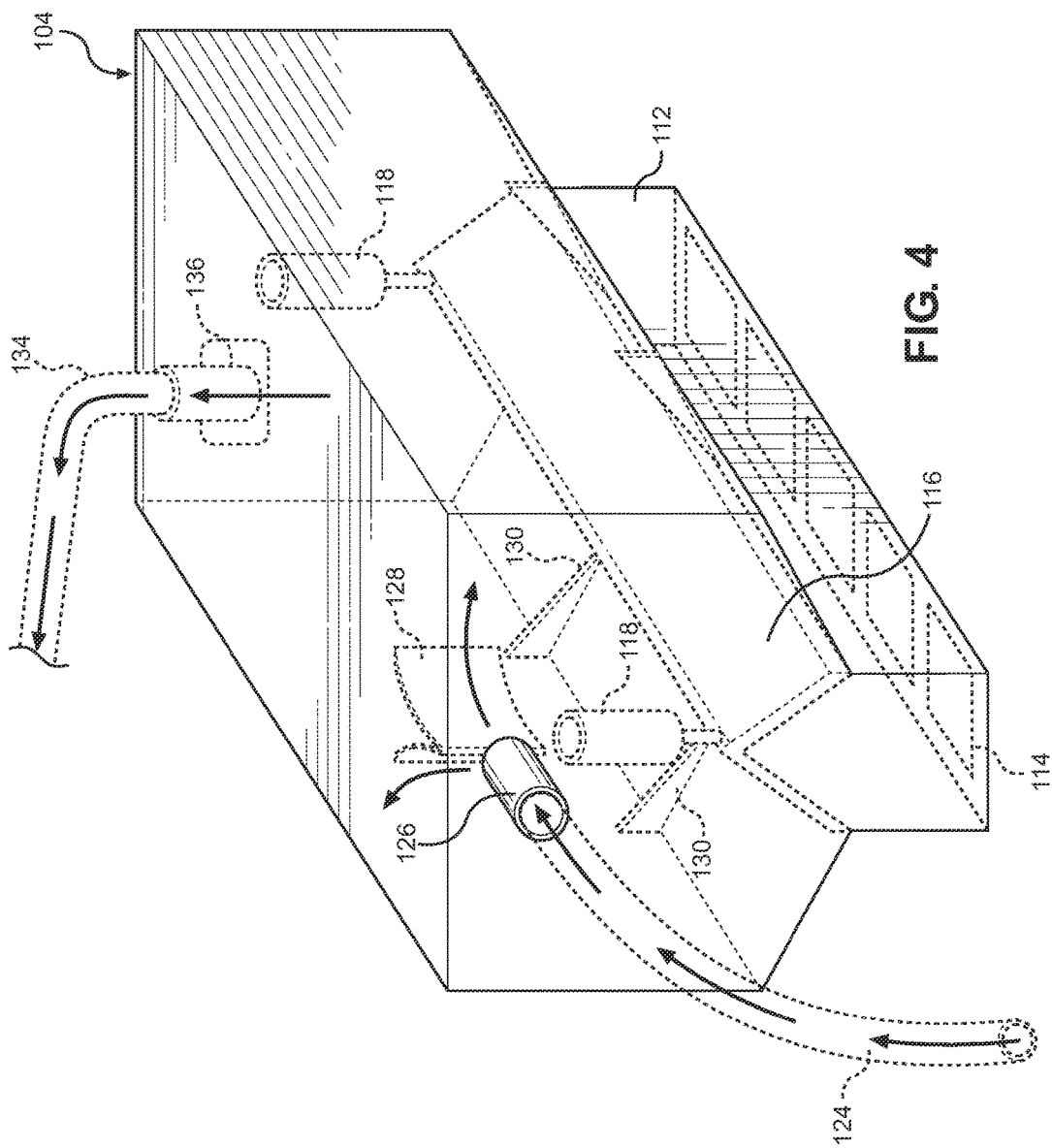
FIG. 4 is a perspective view of a hopper for a material delivery apparatus having a movable drop gate and door seal, door lifters for lifting the door, and a spreading baffle.

The hopper 104 is mounted onto the vehicle 102 and holds the flowable material M while it is being transported before being deposited. The hopper 104 is mounted vertically above the first conveyor 106, also called the feed conveyor, so that flowable material M released from the hopper falls onto the first conveyor. As shown in FIGS. 2-4, the hopper 104 is formed by front and back walls and sidewalls that may be straight or angled, and a bottom. In this particular embodiment, the sidewalls are angled to facilitate the flowable material being released from the bottom of the hopper. The sidewalls form a bottom chute 112 having a number of openings 114 that are sized and positioned to release the flowable material M. In a preferred embodiment, the hopper is fixedly mounted to the vehicle at an angle $\Theta$ (shown in FIG. 1) of about 10 to about 45 degrees such that the front end of the hopper is elevated with respect to the back end. The hopper is preferably angled in this manner to facilitate drainage and to also assist in moving the flowable material out of the bottom openings. Angling the hopper 104 also allows for it to be properly aligned over the first conveyor 106 and for the first conveyor to also be properly positioned over the second conveyor 108, also called the main conveyor. Angling the hopper 104 achieves this proper positioning while also maintaining a relatively low center of gravity, which improves the handling and safety of the apparatus. Without the angling, in order to maintain the proper positioning of the conveyors 106, 108, the hopper 104 would have to be placed at a much higher level and the center of gravity of the apparatus 100 would be much higher, leading to a more top-heavy and potentially dangerous machine.

The hopper 104 may have either an open top or a closed top. The open top version of the hopper may be filled with flowable material M using traditional means, such as a front loader. Alternatively, either the open or closed version of the hopper 104 may be self-filling and be equipped with means for filling the hopper without the need for a front loader or the like. For example, in certain embodiments, the hopper 104 may be equipped with a vacuum system that is designed to suction flowable material M and to deposit that flowable material into the hopper, or vice versa. In the case of a closed top version of the hopper 104, the entire hopper may be constructed as a sealable vacuum chamber and including suction means for providing a vacuum force and intake means for filling the hopper with flowable material M. For example, as shown in FIG. 4, this particular embodiment of the hopper 104 has a closed top and includes a sliding V-shaped drop gate 116 that is placed above the chute located at the bottom of the hopper. The drop gate 116 covers the openings 114 in the bottom of the hopper 104 and prevents the flow of flowable material out of the hopper. The drop gate 116 is configured to be raised and lowered, preferably on tracks located along inside walls of the hopper 104, by lifters 118 such as hydraulic gate lift cylinders. Another function of the drop gate 116 is to provide a seal between the lower openings 114 and the upper section of the hopper 104 to enable a sufficient vacuum pressure to be created inside the hopper. Gaskets 120, such as rubber seals, may be placed around the openings to improve the vacuum seal between the openings 114 and the drop gate 116.

A vacuum blower 122 connected to the hopper 104 creates the internal vacuum pressure and is sized to quickly suction flowable material M and to deposit it in the hopper 104. A first vacuum hose 124 is mounted to an inlet 126 at an intake side of hopper 104. The first hose 124 is used when suctioning flowable material M from a supply location for filling the hopper 104. The hopper 104 may optionally include a dispersion baffle 128 located inside the hopper and mounted adjacent the inlet 126 in the flow path of the incoming flowable material M. In this particular case, the dispersion baffle 138 is somewhat V-shaped and it is used to spread or disperse the flowable material M as it is suctioned and deposited into the hopper 104. The shape of the baffle causes the flow of flowable material to be split leftwards and rightwards as it enters the hopper 104. Similarly, internal baffles 130 mounted on the left and right sides of the hopper 104 assist in guiding the flowable material M towards the lower openings 114 so that the material is ready for release when the drop gate 116 is lifted. A second vacuum hose 132 is mounted to an outlet 134 at an exhaust side of the hopper 104. The opposite end of the second vacuum hose 132 is mounted to the vacuum blower 122. A filter 136 located inside the hopper 104 and mounted at the outlet 134 filters particulate matter in the air. In use, the vacuum blower 122 may be used to suction flowable material M for filling the hopper 104, for removing flowable material from a blast hole, etc., thereby eliminating the need for buckets or front loaders to fill the hopper.

Figure 5:
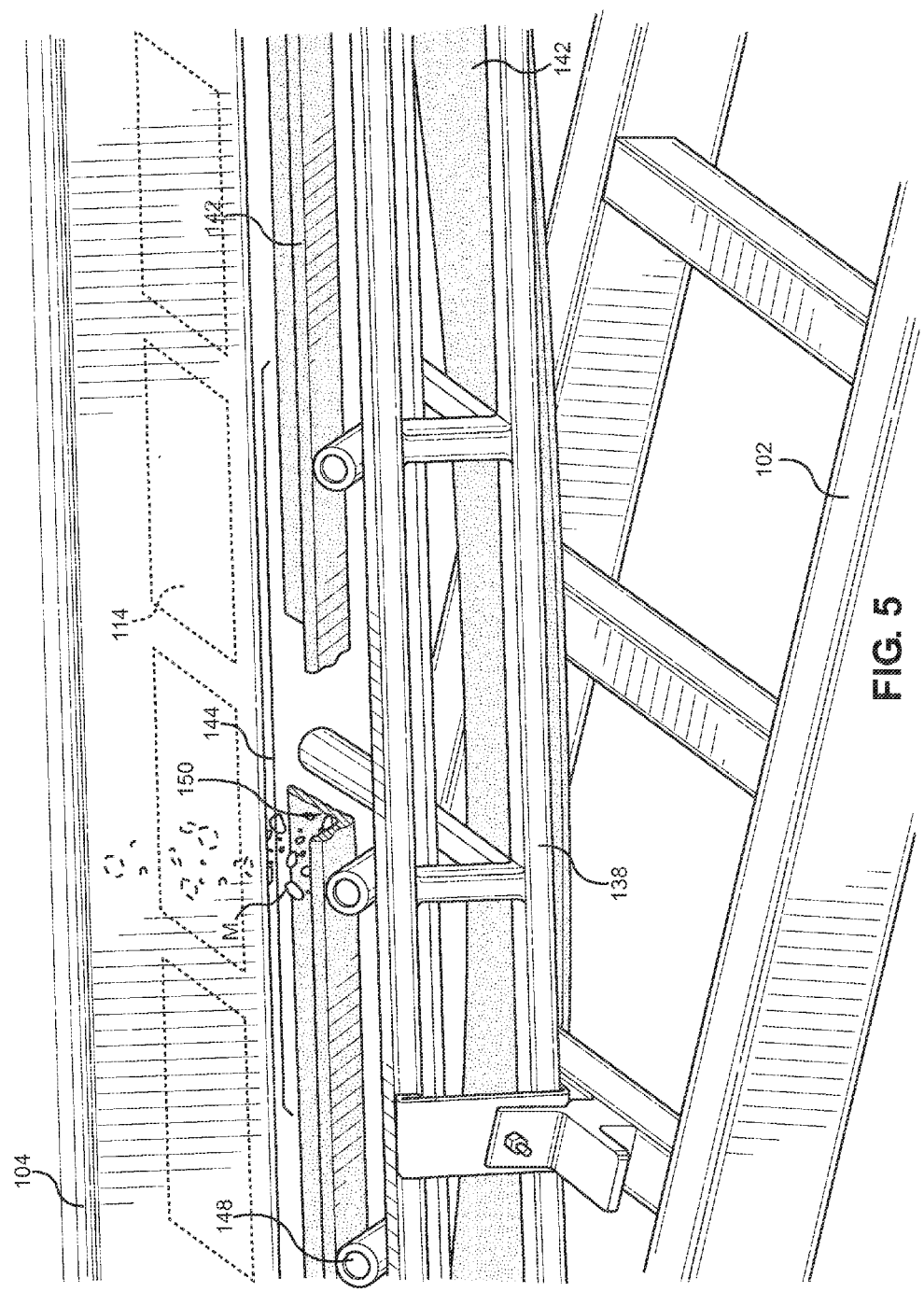
FIG. 5 is a perspective view of the hopper shown in FIG. 4 depicting flowable material being released from the hopper onto a feed conveyor belt.
Figure 6:
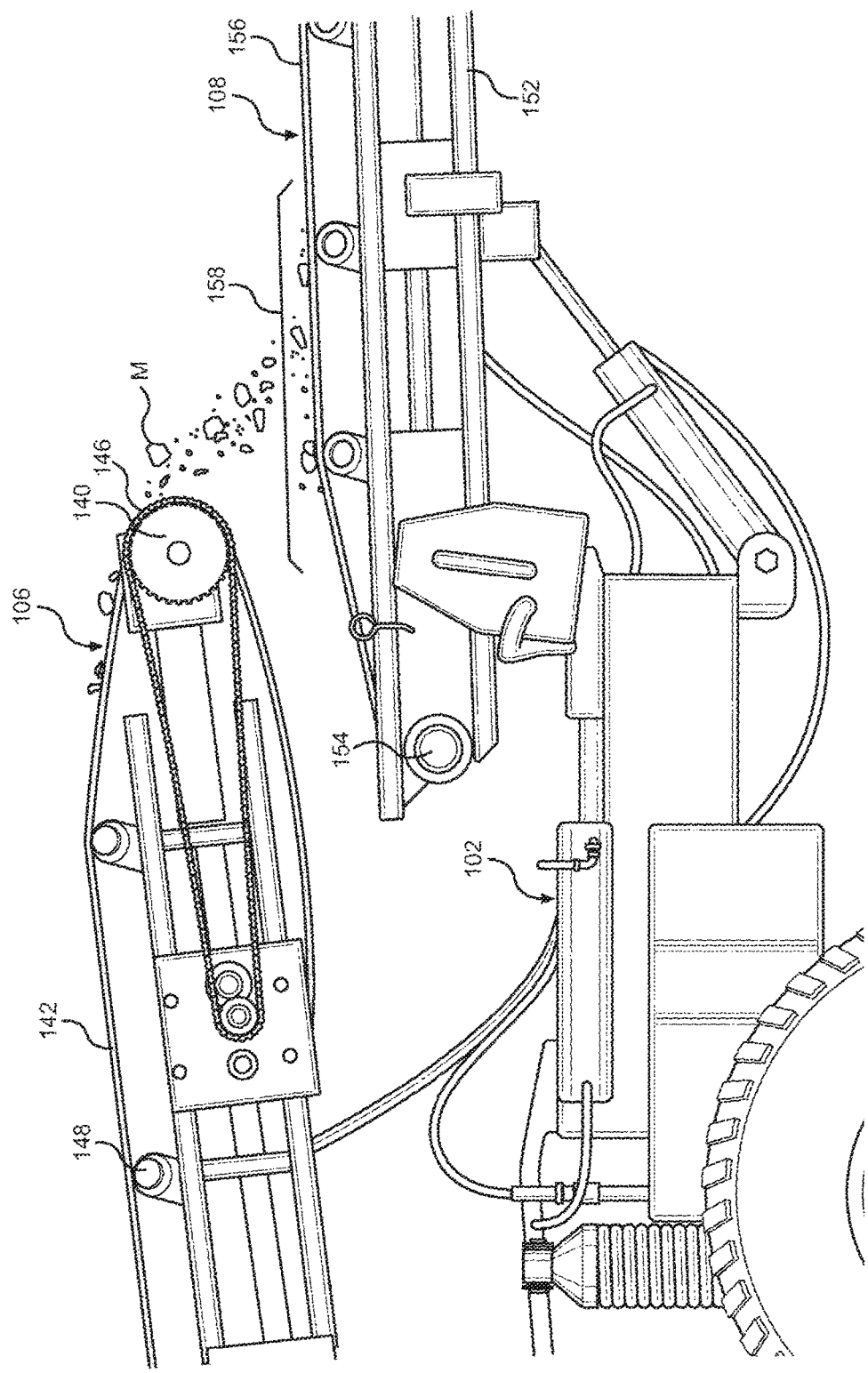
FIG. 6 is a side elevation view of a hopper, feed conveyor, and main conveyor according to an embodiment of the present invention.

Once the hopper 104 has been filled with flowable material M, the material is transported by the vehicle 102 and is then deposited at the deposit D site by the circulating conveyors 106, 108. With reference to FIGS. 2, 5 and 6, the first conveyor 106 is positioned below the hopper 104 so that flowable material M falls through the openings 114 and onto the conveyor belt. The first conveyor 106 includes an elongate first frame 138 having a first end and a second end. First primary rollers 140 are rotatably mounted at the first and second ends of the first frame. A first circulating conveyor belt 142 is positioned on the first frame over the primary rollers 140 and is configured to circulate around the first and second ends of the first frame when the primary rollers rotate. The first belt 142 includes a first receiving portion 144 located below the lower openings 114 of the hopper 104 for receiving the flowable material M released from the hopper. The first belt 142 also includes a first depositing end 146 from which the flowable material M drops as the first circulating belt circulates. The first conveyor 142 also includes a number of support roller pairs 148. Each pair of support rollers 148 is arranged in a V-shaped formation and is positioned along a bottom surface of the first circulating conveyor belt 142 and supports the belt. The outer edges or sides of the belt 142 are raised by the support rollers and form a trough 150 along a central portion of the belt between the raised sides. The raised sides and trough 150 bias the flowable material M released from the hopper 104 into a unified stream as the flowable material moves from the first receiving portion 144 of the first conveyor to the first depositing end 146. Providing this unified stream assists in having a more uniform and consistent flow rate of material and helps to ensure that material is not lost over the sides of the circulating belt.

Figure 7:
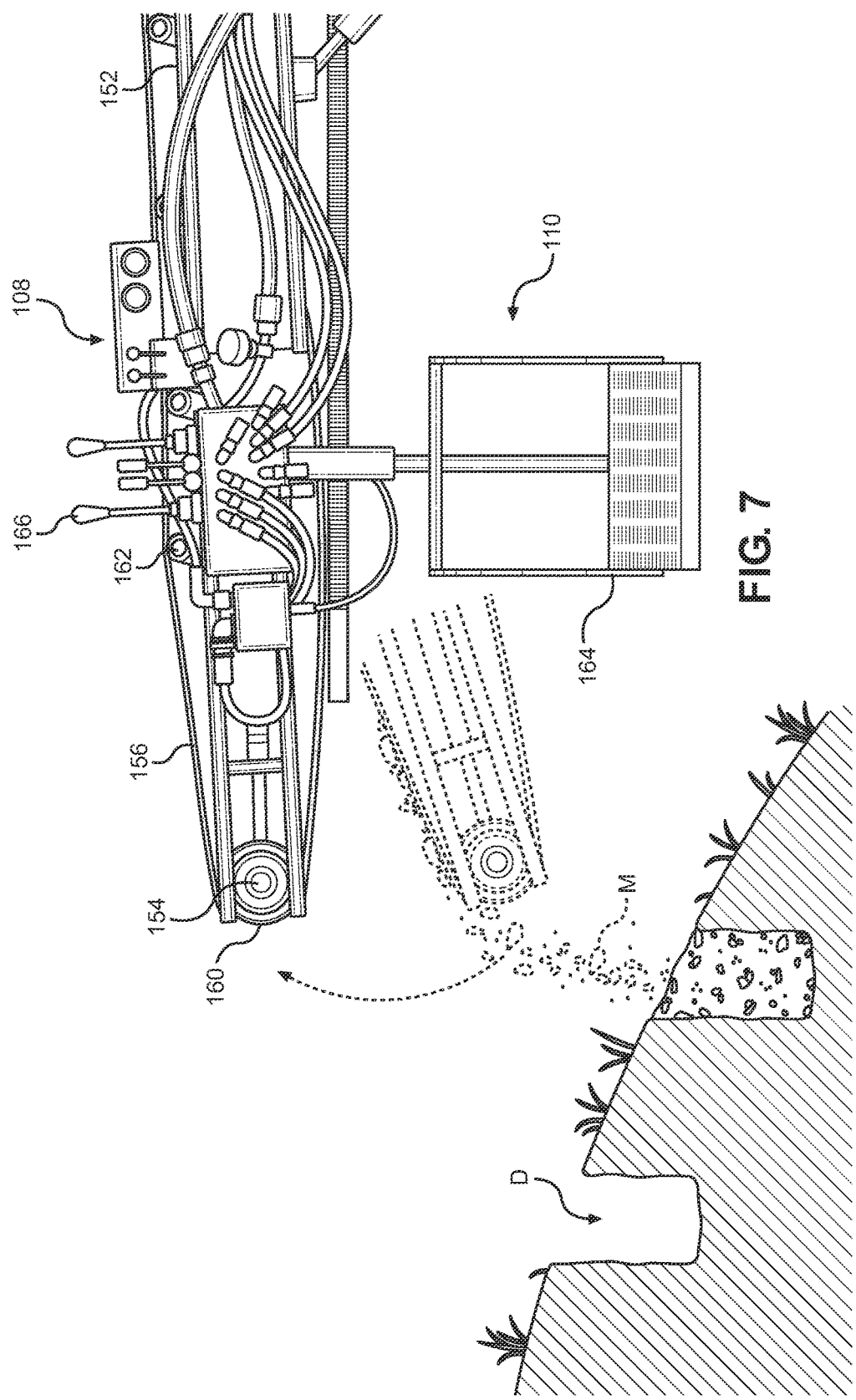
FIG. 7 is a side elevation view of a main conveyor tilting upwards and downwards and depositing flowable material at a deposit site according to an embodiment of the present invention.

With reference to FIGS. 6 and 7, once flowable material M reaches the first depositing end 146, it falls from the first conveyor 106 onto the second conveyor 108. The structure of the second conveyor 108 is substantially similar to that of the first conveyor 106. The second conveyor 108 includes an elongate second frame 152 having a first end and a second end. Second primary rollers 154 are rotatably mounted at the first and second ends of the second frame 152. A second circulating conveyor belt 156 is configured to circulate around the first and second ends of the second 152 frame when the second primary rollers 154 rotate. The second conveyor belt 156 includes a second receiving portion 158 located below the first depositing end 146 of the first circulating conveyor belt 142 for receiving the flowable material M dropped from the first depositing end. The second belt 156 also includes a second depositing end 160 from which the flowable material M is ejected toward the deposit site D as the second circulating conveyor belt 156 circulates. Support roller pairs 162 are arranged in a V-shaped formation and are positioned along a bottom surface of the second circulating conveyor belt 156 and form a trough along a central portion of a portion of the belt between raised sides of the belt.

As discussed above, the first conveyor 106 is fixedly mounted along the bottom of the hopper 104 at an angle. The second conveyor 108, however, is vertically tiltable and laterally rotatable relative to the first circulating conveyor belt to allow the second depositing end 160 to be correctly placed in close proximity to the deposit site D. Importantly, the second receiving portion 158 remains vertically below the first depositing end 146 at all times regardless of the vertical or lateral position of the second depositing end 160. This ensures that flowable material M falls onto the second conveyor 108 from the first conveyor 106. As shown in FIG. 2, the second conveyor 108 can rotate left or right up to 180°. As shown in FIG. 7, the second conveyor 108 can tilt upwards and downwards up to about 45°. Both conveyor belts 142, 156 may be speed adjustable, which enables the flow rate of flowable material to be increased or decreased, preferably the speed of each belt is the substantially the same and may be simultaneously adjusted. Additionally, with respect to the second conveyor 108, increasing and decreasing the speed causes the flowable material to be ejected varying distances from the second depositing end. The titling, rotating and speed adjustments described above enable the apparatus 100 to launch the flowable material M at various trajectories into several deposit sites D without the vehicle being moved.

The vehicle 102 may be driven and the conveyors 106, 108 operated by a single operator located at a floating control station 110, which is located proximate the second depositing end 160 of the second conveyor 108, as illustrated in FIGS. 1, 2 and 7. The control station 110 includes an operator platform 164 that is mounted to the second frame 152 and is located adjacent to the second depositing end 160 of the second circulating conveyor belt 108. The control station 110 is "floating" because when an operator stands on the platform 164, he moves with the second depositing end 160 as the second circulating conveyor belt 108 vertically tilts and laterally rotates. In certain embodiments, as shown best in FIGS. 1, 2 and 7, only one end of the second conveyor 108, namely the end proximate the second receiving portion 158 of the second conveyor 108, is mounted to the vehicle 102. The opposite end of the second conveyor (i.e., proximate the second depositing end 160) is free to move and to rotate and is not mounted to anything. In other words, the second conveyor 108 is cantilevered and the second depositing end 160 extends away from and is not mounted to the vehicle 102. This enables the second depositing end 160 to be vertically titled and laterally rotated so that it is correctly positioned over the deposit sites D. The control station 110 also includes controls 166 that are near the platform that enable a single operator to operate the vehicle 102 and the conveyors 106, 108 while, at the same time, have a nearly ground-level direct line-of-sight view of the flowable material M moving along the second conveyor 108 and being ejected from the second depositing end 160 toward the deposit site D.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A portable material delivery apparatus for transporting and selectively depositing a flowable material at a deposit site, the apparatus comprising:
   a vehicle;
   a hopper mounted onto the vehicle for holding the flowable material, the hopper having a lower opening for releasing the flowable material;
   a first circulating conveyor belt fixedly mounted onto the vehicle for moving the flowable material released from the hopper, the first circulating conveyor belt comprising:
      a first receiving portion located below the lower opening of the hopper and configured to receive the flowable material released from the hopper; and
      a first depositing end from which the flowable material drops as the first circulating conveyor belt circulates;
   a second circulating conveyor belt mounted onto the vehicle for moving the flowable material dropped from the first circulating conveyor belt, the second circulating conveyor belt comprising:
      a second receiving portion located below the first depositing end of the first circulating conveyor belt for receiving the flowable material dropped from the first depositing end; and
      a second depositing end from which the flowable material is ejected toward the deposit site as the second circulating conveyor belt circulates,
      wherein the second circulating conveyor belt is vertically tiltable and laterally rotatable relative to the first circulating conveyor belt; and
   a control station having an operator platform and controls for allowing a single operator to control the movement of the vehicle, the circulation of the belts, and the tilt and rotation of the second conveyor belt, the control station mounted on a side of the second circulating conveyor and disposed adjacent to the second depositing end of the second circulating conveyor belt and movable with the second depositing end as the second circulating conveyor belt vertically tilts and laterally rotates, the control station being positioned such that a single operator positioned on the operator platform can operate the controls while directly observing the flowable material moving on the second conveyor belt and being ejected toward the deposit site.

2. The apparatus of claim 1 further comprising a drop gate configured to move between a first position where the lower opening of the hopper is uncovered and flowable material may be released from the hopper and a second position where the lower opening of the hopper is covered by the drop gate and flowable material is prevented from being released from the hopper.

3. The apparatus of claim 2 further comprising a seal disposed inside the hopper proximate the lower opening, the drop gate configured to contact the seal when in the second position for providing a vacuum seal.

4. The apparatus of claim 3 further comprising a hydraulic gate lifter for moving the drop gate from the first position to the second position.

5. The apparatus of claim 1 wherein the hopper is substantially enclosed and includes a covered top, an intake port, and an exhaust port, the hopper being configured to receive and hold flowable material carried into the hopper by an air stream flowing into the hopper via the intake port and out of the hopper via the exhaust port, wherein the flowable material falls out of the air stream and is deposited in the hopper between the intake and exhaust ports.

6. The apparatus of claim 5 further comprising a baffle disposed inside the hopper adjacent the intake port and positioned in the air stream, the baffle configured to cause the air flow stream to deviate and the flowable material to be deposited in the hopper.

7. The apparatus of claim 6 wherein the baffle is substantially V-shaped and is configured to split the air stream and to cause portions of the flowable material to be deposited at opposite sides of the hopper.

8. The apparatus of claim 5 further comprising:
a first vacuum hose mounted to the hopper intake for suctioning flowable material;
a vacuum blower mounted to the hopper exhaust via a second vacuum hose for creating the air stream,
wherein flowable material is suctioned by the air stream into the first hose and is deposited into the hopper and then the air stream flows out of the exhaust, through the second hose, and then out through the vacuum blower.

9. The apparatus of claim 8 further comprising an air filter disposed in the exhaust port for filtering the air stream before it reaches the vacuum.

10. The apparatus of claim 1 further comprising: a first plurality of support roller pairs positioned along a bottom surface of the first circulating belt; and a second plurality of support rollers positioned along a bottom surface of the second circulating belt.

11. The apparatus of claim 10 wherein the first plurality of support rollers are arranged in pairs, each pair in a V-shaped formation, beneath the first circulating belt causing a trough to be formed in at least a portion of the first circulating belt for biasing the flowable material released from the hopper into a unified single stream as the flowable material moves from the first receiving portion to the first depositing end; and the second plurality of support rollers are arranged in pairs, each pair in a V-shaped formation, beneath the second circulating belt causing a trough to be formed in at least a portion of the second circulating belt for biasing the flowable material deposited by the first circulating belt into a unified stream as the flowable material moves from the second receiving portion to the second depositing end.

12. The apparatus of claim 1 wherein the speed of the second circulating conveyor belt is variable for enabling the flowable material to be ejected from the second depositing end to be deposited at a distance from the second conveyor belt dependent on the speed of the second circulating conveyor belt.

13. The apparatus of claim 1 wherein the speed of the first and second circulating conveyor belts is substantially equivalent and may be simultaneously adjusted by the operator.

14. The apparatus of claim 1 wherein the second circulating conveyor can rotate left and right up to 180°.

15. The apparatus of claim 1 wherein the second circulating conveyor can tilt upwards and downwards up to 45°.

16. A material delivery apparatus for transporting and selectively depositing a flowable material, the apparatus comprising:
a vehicle;
a hopper mounted onto the vehicle configured to hold flowable material and to release the flowable material via an opening in the hopper;
a first conveyor fixedly mounted onto the vehicle having a first receiving end and a first depositing end, wherein flowable material is released from the hopper onto a circulating belt of the first conveyor at the first receiving end and is carried by the belt to the first depositing end and deposited from the belt;
a second conveyor having a second receiving end mounted onto the vehicle, a second depositing end, and a circulating belt, the second conveyor being selectively vertically tiltable and selectively laterally rotatable about the second receiving end via operator controls and the belt circulating at an operator-selected speed, wherein flowable material deposited from the first depositing end of the first conveyor falls onto the circulating belt at the second receiving end of the second conveyor and is carried by the circulating belt to the second depositing end of the second conveyor and deposited at a selected deposit site; and
a control station mounted to the second conveyor proximate the second depositing end and having controls for a single operator to operate the movement of the vehicle, the circulation and circulation speed of the belts and the tilt and rotation of the second conveyor.

17. The apparatus of claim 16 wherein the second conveyor is cantilevered.

18. The apparatus of claim 16 wherein the controls include controls for adjusting circulation speed of the circulating belt of the second conveyor, wherein adjusting circulation speed enables the operator to vary the distance that the flowable material is deposited from the second depositing end.

* * * * *